United States Patent [19]
Hambright

[11] Patent Number: 5,938,989
[45] Date of Patent: Aug. 17, 1999

[54] DIFFRACTIVE OPTICAL ELEMENTS

[75] Inventor: Gregory Hambright, Elkmont, Ala.

[73] Assignee: MEMS Optical, Inc., Huntsville, Ala.

[21] Appl. No.: 08/788,289

[22] Filed: Jan. 24, 1997

[51] Int. Cl.⁶ ..................................................... B29D 11/00
[52] U.S. Cl. .......................... 264/2.5; 264/1.32; 264/1.33; 264/1.36; 264/2.7
[58] Field of Search .................................. 264/1.32, 1.33, 264/1.36, 2.5, 485, 162, 2.7, 1.37

[56] References Cited

U.S. PATENT DOCUMENTS

| | | |
|---|---|---|
| 4,185,955 | 1/1980 | Holmes et al. . |
| 4,582,885 | 4/1986 | Barber . |
| 4,707,321 | 11/1987 | Segawa et al. . |
| 4,910,291 | 3/1990 | Yamamoto et al. . |
| 5,013,494 | 5/1991 | Kubo et al. . |
| 5,071,597 | 12/1991 | D'Amato et al. . |
| 5,189,531 | 2/1993 | Palmer et al. . |
| 5,279,924 | 1/1994 | Sakai et al. . |
| 5,538,674 | 7/1996 | Nisper et al. . |

FOREIGN PATENT DOCUMENTS 360192734   10/1985   Japan .

*Primary Examiner*—Mathieu D. Vargot
*Attorney, Agent, or Firm*—Dickstein Shapiro Morin & Oshinsky LLP

[57] ABSTRACT

A method for the replication of diffractive optical elements using audio/video disc manufacturing equipment and processes. The audio/video disc manufacturing process and mold mastering tooling create diffractive optical elements using a mold plate. The diffractive optic design and photomasks are first fabricated then replicated using compact disc industry mold mastering techniques. The surface relief pattern is produced centered in the plate using ion milling or refractive ion etching photolithographic fabrication techniques. Once patterned, the mold master plate is punched into a circular form consistent with standard compact or video disc mold bases—typically eight inches for a compact disc. After molding, each element can be cut out of the disc using blade, shear, waterjet or laser cutting.

13 Claims, 3 Drawing Sheets

FIG. 4
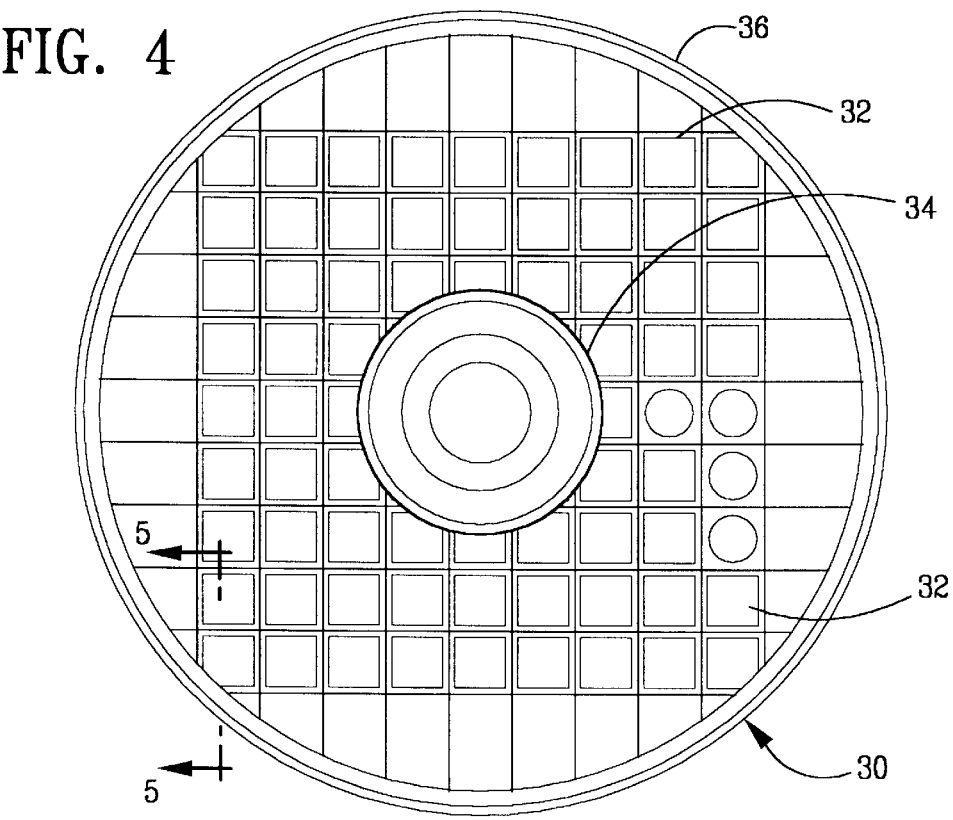
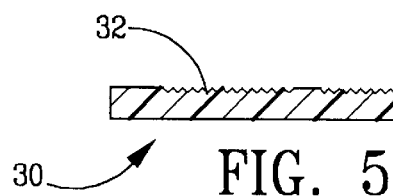
FIG. 5
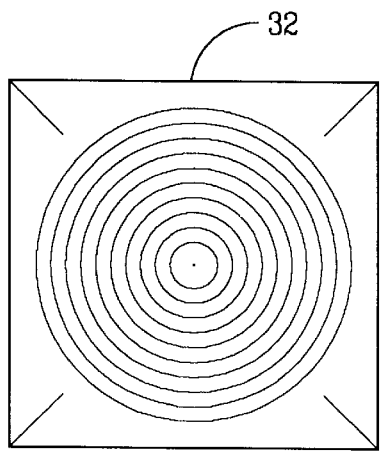
FIG. 6
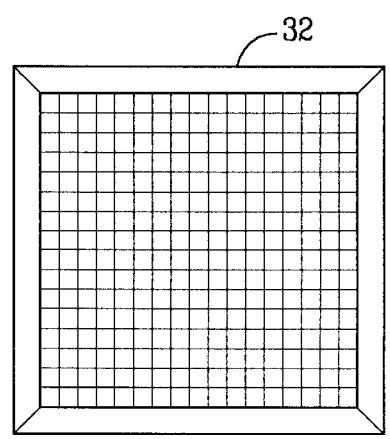
FIG. 7

DIFFRACTIVE OPTICAL ELEMENTS

BACKGROUND

The present invention relates to a method of manufacturing diffractive optical elements and more particularly to a method of manufacturing diffractive optical elements using photolithographic mastering and audio/video disc manufacturing equipment and processes.

Diffractive lens elements have been made by photolithographic manufacturing techniques. First, a pattern is produced by an optical designer with appropriate output file formats to be written by e-beam into a single or series of photomask(s). The patterns may have a distinct binary or multiphase grating designed to create a desired diffraction effect. Photolithographic processes are then used to transfer the pattern in the photomask(s) into a substrate having the necessary mechanical and transmissive characteristics. The substrate can be quartz, fused silica or other material.

It has also been suggested that diffractive lens elements or multiple diffractive and refractive integrated optical assemblies can be formed by plastic replication techniques. Photomasks are produced and used to create a master for molding. The mold materials must be durable enough to withstand the molding process. The diffractive patterns are transferred to the mold master using photolithographic processes specifically characterized for the physical configuration and material being used.

U.S. Pat. No. 5,538,674 to Nisper et al., the disclosure of which is incorporated herein by reference, illustrates a method of making holograms, kinoforms, diffractive optical elements and microstructures. U.S. Pat. No. 5,013,494 to Kubo et al., the disclosure of which is incorporated herein by reference, illustrates a method of making desired surfaces using injection mold techniques.

Prior art systems for producing plastic diffractive lens elements or lens systems have a number of disadvantages. The molds are usually single purpose tools dictated by the physical size of the diffractive lens. Since each mold is designed for a specific application, a manufacturer may incur significant costs to justify tooling. In many cases, the projected volume of the product being produced will not justify the cost.

Thus, alternate manufacturing processes are used, such as straight etching of the desired pattern into a substrate which is then cut to the desired form factors. In order to maintain the maximum efficiency of the diffractive lens, multiple phase steps are required by the design. In manufacturing, this requires the initial etching of the pattern using photolithographic processes and subsequent mask alignment or multiple mask alignment to the previous etch or etches. This process is both time consuming and costly.

Moreover, even in cases where the production volume justifies the expense to produce a mold base, there is the disadvantage that the system can produce only one optical element or lens system per molding operation. An additional disadvantage is the production lead time required. The production lead time may exceed six months for the design and construction of the mold.

Moreover, custom tooling and refined characterization of the photolithographic procedures may be required. In addition, significant time may be required to characterize both the new mold and the molding process for the specific application. Even during production, the throughput or capacity of the mold is often limited.

In cases where a mold is "reused" for multiple products, the generic mold base must be fitted with diffractive pins customized for the application. These pins must be fabricated and then etched with the desired patterns. This may require weeks of tooling to complete.

SUMMARY OF THE INVENTION

The present invention alleviates to a great extent the disadvantages of the prior art by using existing audio/video disc manufacturing processes and equipment to create diffractive optical elements.

In one aspect of the invention, audio/video manufacturing equipment is modified and used to manufacture an array of diffractive optical elements.

It is an object of the present invention to reduce the time required to realize end products from design inputs. With the present invention, once photomasks are produced for the designed optic, mold mastering may be accomplished in a few days. Once a plate with the desired surface relief pattern is completed, plastic products can be produced in a few hours. Thus, the time it takes to produce a new product is reduced.

It is another object of the present invention to utilize the existing capital equipment base residing in the compact disc industry. U.S. Pat. No. 4,185,955 to Holmes et al. and U.S. Pat. No. 4,707,321 to Segawa, the disclosures of which are incorporated herein by reference, illustrate systems for molding centrally apertured video disc records. The molds used by the invention reside in large numbers in industry. As new technology emerges for mass storage of digital data, these molds will become even more accessible to the optics industry. Diffractive optics being produced by these techniques have recurring costs an order of magnitude less than those being produced using other technology.

It is another object of the present invention to use pre-existing photolithographic masks to produce molds used with audio/video compact disc manufacturing equipment.

It is another object of the present invention to produce high quality optical products. Manufacturing process used by the compact disc industry are well documented and defined by compact disc manufacturers. Molding characteristics of polycarbonate for compact discs is also well understood by those in the compact disc industry. Thus, compact disc manufacturing equipment can be used in the present invention to produce high quality optical elements.

It is another object of the present invention to create diffractive optics in an essentially planar array. This allows large elements to be stacked together to correct optical aberrations much in the same way as conventional glass lenses may be aligned to correct for chromatic and spherical aberrations.

Creating diffractive optics in an essentially circular planar array also allows stacked elements to be rotated with respect to each other about their central axis. This allows variability in polarization, beam scanning, and wavelength selection to be accomplished.

It is another object of the present invention to provide industry with a low cost, high production volume process for the replication of diffractive optics.

Other objects and advantages of the invention will be readily apparent from the following description and drawings which illustrate preferred embodiments of the invention.

BRIEF DESCRIPTION OF THE DRAWINGS

FIG. 4 is a plan view of a polycarbonate disc formed using the nickel master plate of FIG. 3.

FIG. 5 is a partial cross sectional view of the disc shown in FIG. 4.

FIG. 6 is an enlarged plan view of a diffractive lenslet cut from the polycarbonate disc shown in FIG. 4.

FIG. 7 is an enlarged plan view of a diffractive grating cut from the polycarbonate disc shown in FIG. 4.

DETAILED DESCRIPTION OF PREFERRED EMBODIMENTS

Figure 1A:
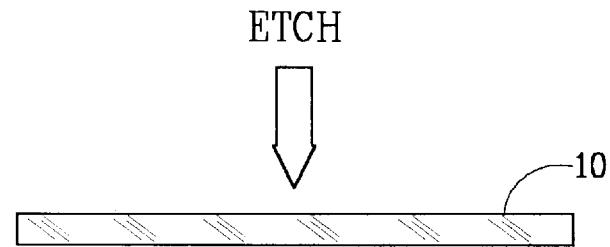
FIGS. 1a through 1c show the steps used to manufacture optical elements according to a preferred embodiment of the invention.
Figure 1B:
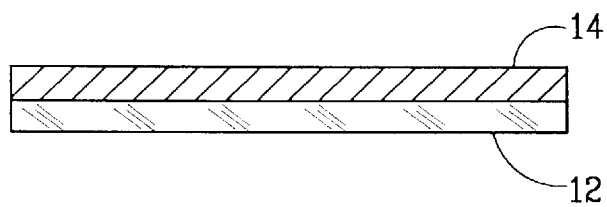
Figure 1C:
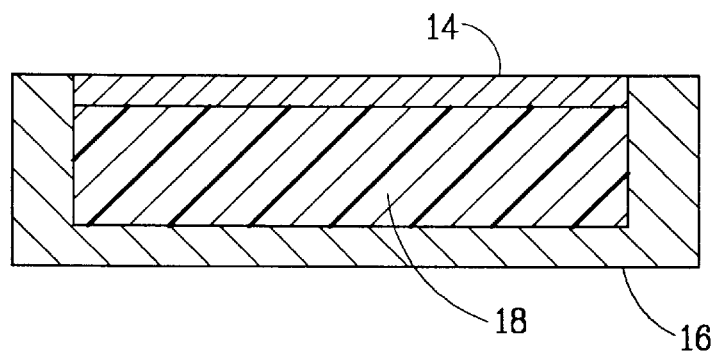

Referring now to the drawings, where like numerals designate like elements, there is shown in FIGS. 1a through 1c the steps used to manufacture optical elements according to a preferred embodiment of the invention. Optical patterns are etched into a substrate 10 to form an etched substrate 12 (FIG. 1b). For clarity of illustration, the pattern itself is not shown in the FIGS. 1a through 1c. The etched substrate 12 is used to create a mold master 14 with corresponding negative patterns. Then, the mold master 14 is used in a mold 16 to create a disc 18 with optical patterns corresponding to those that were etched into the substrate 10 (12).

The diffractive optic pattern can be etched into the substrate 10 using photomasks (not shown) and lithographic techniques. The substrate 10 may be quartz, fused silica or other suitable material. Once the patterns have been developed, the mold master is electro-deposited on the etched substrate. The plate 14 is typically formed of nickel-plated material, but any alloy suitable for the mold base and process can also be used. The diameter of the mold plate 14 may be from about four to about fourteen inches for compact and laser disc molding. The mold plate 14 may have a thickness from about two hundred and seventy to about four hundred microns. The actual thickness of the plate 14 can be varied depending on the desired mechanical stability, surface RMS, and flatness desired or required by the diffractive design.

Figure 3:
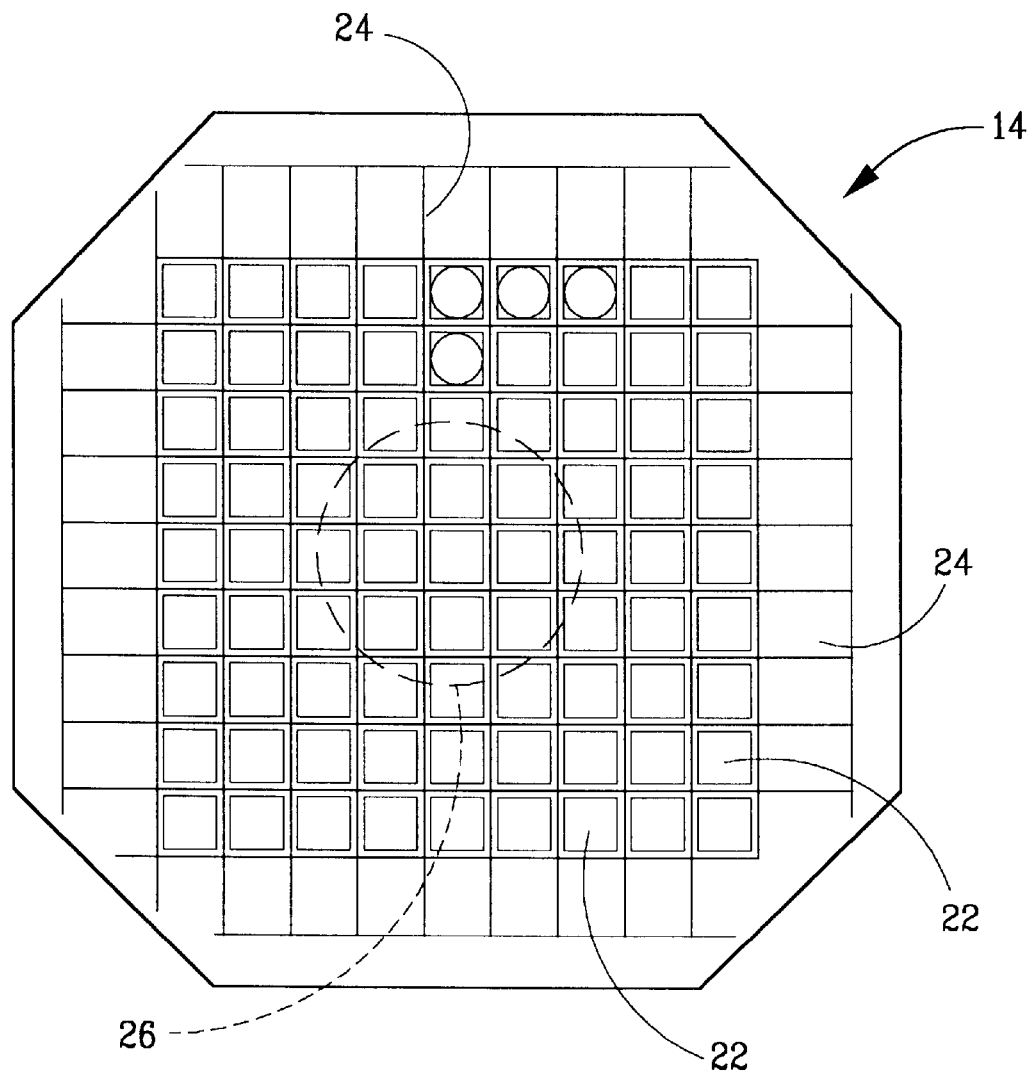
FIG. 3 is a plan view of a nickel master plate for creating diffractive optical elements.

The mold plate 14 is shown in more detail in FIG. 3. The overall diameter of the master mold plate 14 is approximately seven and one half inches. Only the patterns 22 in the central region four and one half inches in diameter are used to create optical elements. These optical patterns 22 are represented by the smaller squares between the ruled lines 24.

The working diameter of the diffractive patterns 22 cannot exceed about four and three quarter inches circular for the standard compact disc mold bases, or eleven and eight tenths inches diameter for the standard video disc mold base. Individual diffractive patterns 22, therefore, can range in size up to the maximum working diameter of the mold base 14. However, any patterns 22 in the central one and a half inch diameter of the plate 14 will not produce optical elements because this area is used by the mold base 14 as the injection sprue for the plastic resin out of which the diffractive parts 22 will be made.

The large area available for molding allows multiple diffractive patterns 22 to be formed onto the mold plate 14. With a one millimeter (mm) allowance between patterns 22 for cutting, for instance, five hundred and twelve diffractive patterns on three mm centers, or one hundred and fifty five diffractive patterns on five mm centers can be formed on one mold plate 14. It is also possible to form a lesser number of larger diameter diffractive parts.

The mold master plate 14, once patterned, is then punched into a circular form consistent with standard compact or video disc mold bases—typically eight inches for a compact disc. During the punching process, the center of the plate (shown in dotted lines in FIG. 3 and designated by reference numeral 26) is removed to form a circular hole and the mold master plate is placed in the mold base.

Production of the diffractive lenses results from manufacturing process consistent with compact disc and video disc production. Typical materials used in this replication process are optical grade polycarbonate, acrylic or other suitable polymers.

FIGS. 4 and 5 show an annular disc 30 or plate in which many different diffractive elements 32 have been produced in polycarbonate using the mold plate 14 shown in FIG. 3. The disc 30 has a circular hole in the center 34 and a circular periphery 36. The disc 30 may have a thickness of one and three tenths millimeters (mm). The disc 30 can also be to be only half as thick as a standard compact disc, or 0.65 mm. Recently developed processes related to high density compact discs, or digital video discs (DVD) enable replication of diffractive lens elements with thicknesses of 0.625 mm.

After molding, each element 32 may be cut out of the disc 30 using blade, shear, waterjet or laser cutting.

FIGS. 6 and 7 show examples of individual diffractive elements 32 cut from the disc 30 shown in FIGS. 4 and 5.

Figure 2A:
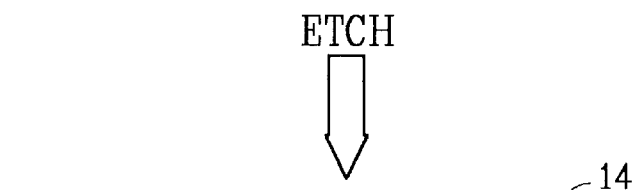
FIGS. 2a and 2b show the steps used to manufacture optical elements according to another preferred embodiment of the invention.
Figure 2B:
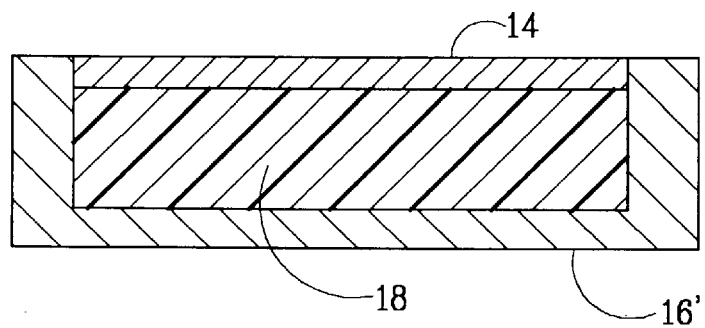

A second method for creating mold masters with diffractive patterns is to etch the positive diffractive surface relief pattern, using photolithographic techniques, directly into a nickel substrate electroformed on a mirror block. FIGS. 2a and 2b show the steps used to manufacture optical elements according to this preferred embodiment of the invention. As shown in FIG. 2a, an optical pattern is etched into a mold master 14. This mold master 14 is then placed in a mold 16' and an optical element 18 is created as shown in FIG. 2b.

Although preferred embodiments are specifically illustrated and described herein, it will be appreciated that modifications and variations of the present invention are covered by the above teachings and within the purview of the appended claims without departing from the spirit and intended scope of the invention. For example, the processes defined herein can be used to replicate both refractive and reflective diffractive optical elements. Surface patterns for spherical and aspheric lenses, diffractive and refractive micro-lens arrays can all be replicated in plastic and other materials using the techniques described. Large diffractive optics of diameters up to fourteen inches can also be mass produced using this process.

What is claimed as new and desired to be secured by Letters Patent of the United States is:

1. A method of manufacturing a plurality of separate optical elements, said method comprising the steps of:

forming a plurality of patterns in an ordered array on a first element;

using said first element to produce a mold master element having a plurality of negative patterns in an ordered array, wherein said negative patterns correspond to the patterns on said first element;

using said mold master element to form a plurality of annular plates, with each of said plates having a plurality of molded optical elements, wherein said molded optical elements have molded patterns corresponding to the plurality of patterns on said first element, and wherein said molded optical elements are located in ordered arrays in said annular plates, and wherein said ordered arrays of said molded optical elements correspond to said ordered array of said patterns on said first element; and wherein said method further comprises the step of separating said molded optical elements from each other, said separating step including the step of cutting through said annular plates along lines defined by said ordered arrays of said molded optical elements.

2. A method of manufacturing a plurality of optical elements according to claim 1, wherein said step of using said mold master element to form said plurality of annular plates is performed using audio/video disc manufacturing equipment.

3. A method of manufacturing a plurality of optical elements according to claim 2, wherein said plurality of optical elements are diffractive optical elements.

4. A method of manufacturing a plurality of optical elements according to claim 3, further comprising the step of forming a circular hole in the center of each annular plate.

5. A method of manufacturing a plurality of optical elements according to claim 4, wherein said annular plates each have a circular periphery.

6. A method of manufacturing a plurality of optical elements according to claim 1, whereon said first element is formed of quartz.

7. A method of manufacturing a plurality of optical elements according to claim 6, wherein said mold master element is formed of nickel plated material.

8. A method of manufacturing optical elements, the method comprising the steps of:

creating a mold master having a negative of at least one optical pattern;

using the mold master with audio/video disc manufacturing equipment to mold optical elements in annular plates, such that said annular plates each contain at least one optical element and a central hole, and such that the molded surfaces of said optical elements correspond to the optical pattern of said mold master; and wherein said manufacturing method further comprises the step of subsequently cutting said optical elements from said annular plates.

9. A method of manufacturing optical elements according to claim 8, wherein said optical elements are diffractive optical elements.

10. A method of manufacturing optical elements according to claim 8, wherein said optical elements are refractive optical elements.

11. A method of manufacturing optical elements according to claim 8, wherein said optical elements are refractive and diffractive optical elements.

12. A method of manufacturing optical elements according to claim 8, wherein said annular plates are optical grade polycarbonate.

13. A method of manufacturing optical elements according to claim 8, wherein said annular plates are acrylic.

* * * * *